(12) United States Patent
Abraham

(10) Patent No.: US 8,779,975 B2
(45) Date of Patent: Jul. 15, 2014

(54) METHOD AND SYSTEM FOR ADJUSTING A MEASUREMENT CYCLE IN A WIRELESS RECEIVER

(71) Applicant: Global Locate, Inc., Irvine, CA (US)

(72) Inventor: Charles Abraham, Los Gatos, CA (US)

(73) Assignee: Global Locate, Inc., Irvine, CA (US)

( * ) Notice: Subject to any disclaimer, the term of this patent is extended or adjusted under 35 U.S.C. 154(b) by 0 days.

(21) Appl. No.: 13/949,641

(22) Filed: Jul. 24, 2013

(65) Prior Publication Data

US 2014/0055301 A1 Feb. 27, 2014

Related U.S. Application Data

(63) Continuation of application No. 13/176,013, filed on Jul. 5, 2011, now Pat. No. 8,508,407, which is a continuation of application No. 11/327,036, filed on Jan. 6, 2006, now Pat. No. 7,973,710, which is a continuation of application No. 10/912,516, filed on Aug. 5, 2004, now Pat. No. 7,012,564.

(51) Int. Cl.
*G01S 19/29* (2010.01)
(52) U.S. Cl.
USPC .................................................. 342/357.68
(58) Field of Classification Search
CPC ......... G01S 19/44; G01S 19/09; G01S 19/24; G01S 19/29

USPC ............. 342/357.26, 357.46, 357.63, 357.68; 701/468, 470

See application file for complete search history.

(56) References Cited

U.S. PATENT DOCUMENTS

| | | | |
|---|---|---|---|
| 4,928,106 A | 5/1990 | Ashjaee et al. | |
| 5,495,408 A | 2/1996 | Caldwell | |
| 5,542,113 A | 7/1996 | Fink et al. | |
| 5,583,776 A | 12/1996 | Levi et al. | |
| 6,163,294 A | 12/2000 | Talbot | |
| 6,466,803 B1 | 10/2002 | Gardner | |
| 6,469,663 B1 | 10/2002 | Whitehead et al. | |
| 6,608,998 B1 | 8/2003 | Neumann et al. | |
| 7,012,564 B2 | 3/2006 | Abraham | |
| 7,973,710 B2 | 7/2011 | Abraham | |
| 2003/0069684 A1 | 4/2003 | Reimer | |
| 2006/0100781 A1 | 5/2006 | Lin et al. | |
| 2006/0212271 A1 | 9/2006 | Grenfell et al. | |
| 2008/0046179 A1 | 2/2008 | Mackintosh et al. | |

*Primary Examiner* — Dao Phan
(74) *Attorney, Agent, or Firm* — Sterne, Kessler, Goldstein & Fox P.L.L.C.

(57) ABSTRACT

Methods and systems for measuring wireless signals in a wireless receiver are described. The method includes designating a measurement cycle frequency for the wireless receiver at a nominal frequency. A determination that a motion change event has occurred can be determined based on the detection of a transition between base stations in a wireless communications network. In response to the motion change event, the measurement cycle frequency can be adjusted according to various aspects of the disclosure.

20 Claims, 3 Drawing Sheets

METHOD AND SYSTEM FOR ADJUSTING A MEASUREMENT CYCLE IN A WIRELESS RECEIVER

CROSS-REFERENCE TO RELATED APPLICATIONS

This application is a continuation of co-pending U.S. patent application Ser. No. 13/176,013, filed Jul. 5, 2011, which is a continuation of U.S. patent application Ser. No. 11/327,036 (now U.S. Pat. No. 7,973,710), filed Jan. 6, 2006, which is a continuation of U.S. patent application Ser. No. 10/912,516 (now U.S. Pat. No. 7,012,564), filed Aug. 5, 2004, which are incorporated herein by reference in their entirety.

BACKGROUND OF THE INVENTION

1. Field of the Invention

Embodiments of the present invention generally relate to position location systems. More particularly, the invention relates to a method for adjusting a measurement cycle in a satellite positioning system signal receiver.

2. Description of the Related Art

Global Positioning System (GPS) receivers use measurements from several satellites to compute position. GPS receivers normally determine their position by computing time delays between transmission and reception of signals transmitted from satellites and received by the receiver on or near the surface of the earth. The time delays multiplied by the speed of light provide the distance from the receiver to each of the satellites that are in view of the receiver.

More specifically, each GPS signal available for commercial use utilizes a direct sequence spreading signal defined by a unique pseudo-random noise (PN) code (referred to as the coarse acquisition (C/A) code) having a 1.023 MHz spread rate. Each PN code bi-phase modulates a 1575.42 MHz carrier signal (referred to as the L1 carrier) and uniquely identifies a particular satellite. The PN code sequence length is 1023 chips, corresponding to a one millisecond time period. One cycle of 1023 chips is called a PN frame or epoch.

GPS receivers determine the time delays between transmission and reception of the signals by comparing time shift between the received PN code signal sequence and internally generated PN signal sequences. These measured time delays are referred to as "sub-millisecond pseudoranges", since they are known modulo the 1 millisecond PN frame boundaries. By resolving the integer number of milliseconds associated with each delay to each satellite, then one, has true, unambiguous, pseudoranges. A set of four pseudoranges together with a knowledge of absolute times of transmission of the GPS signals and satellite positions in relation to these absolute times is sufficient to solve for the position of the GPS receiver. The absolute times of transmission (or reception) are needed in order to determine the positions of the GPS satellites at the times of transmission and hence to compute the position of the GPS receiver.

Positioning systems, such as GPS, have fostered numerous applications that involve tracking people and assets. Various systems provide periodic location of a fixed asset, notification of proximity to pre-requested services, on-demand location identification, or continuous tracking of the location of a person or asset. Presently, such systems engage in satellite measurements at a device being tracked on a schedule unrelated to the relevance of the tracking information. This results in tracking the device continuously or tracking the device too infrequently to be effective. Continuous tracking directly results in increased power consumption in the device. Conversely, accessing the device too infrequently results in decreased accuracy and tracking performance.

Therefore, there exists a need in the art for a method that provides for the automatic adjustment of a measurement cycle in a satellite positioning system signal receiver.

SUMMARY OF THE INVENTION

A method for adjusting a measurement cycle in a satellite signal receiver is described. In one embodiment, a notification is received at the satellite signal receiver in response to at least one of a route-critical event and a motion-change event. A frequency of the measurement cycle is then adjusted in response to the notification. In one embodiment, the route-critical event comprises the satellite signal receiver being within a threshold distance of a route-critical location along a route. A motion-change event comprises a change in motion of the satellite signal receiver with respect to a threshold value.

In another embodiment, a mobile receiver includes a satellite signal receiver and a processor. The satellite signal receiver is configured to measure pseudoranges from the mobile receiver to a plurality of satellites as part of a measurement cycle. The satellite signal receiver is further configured to periodically execute the measurement cycle. The processor is configured to adjust the frequency of the measurement cycle in response to a notification indicative of at least one of a route-critical event and a motion-change event. In one embodiment, the mobile receiver further includes a sequential estimation filter, such as a Kalman filter, and the satellite signal receiver is further configured to apply pseudoranges to the sequential estimation filter as part of the measurement cycle.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, whenever possible, to designate identical elements that are common to the figures.

DETAILED DESCRIPTION

A method and apparatus for adjusting a measurement cycle in a satellite positioning system signal receiver is described. Those skilled in the art will appreciate that the invention may be used with various types of mobile or wireless devices that are "location-enabled," such as cellular telephones, pagers, laptop computers, personal digital assistant (PDAs), and like type mobile devices known in the art. Generally, a location-enabled mobile device is facilitated by including in the device the capability of processing satellite positioning system (SPS) satellite signals, such as Global Positioning System (GPS) signals.

Figure 1:
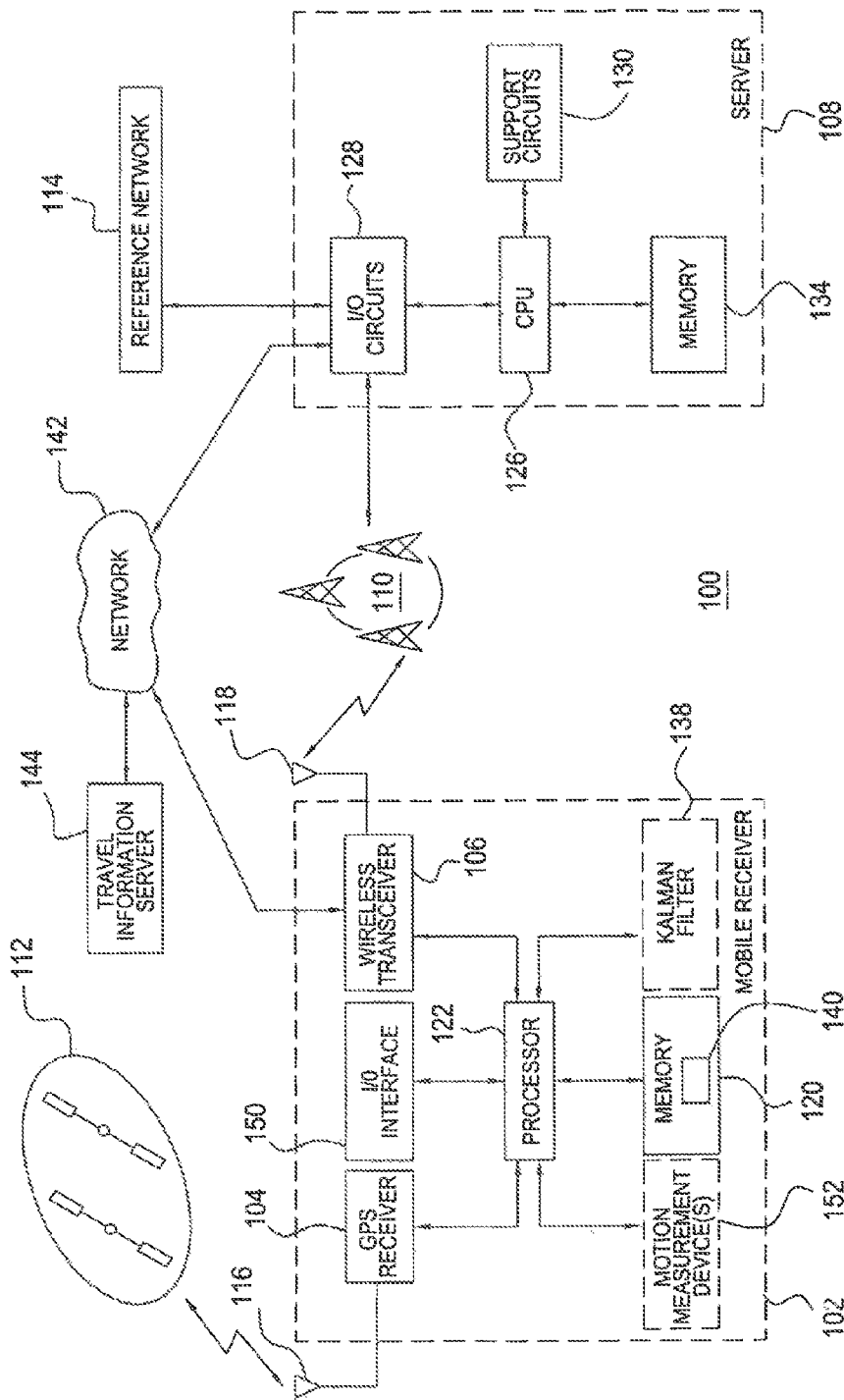
FIG. 1 is a block diagram depicting an exemplary embodiment of a position location system in which the present invention may be utilized.

FIG. 1 is a block diagram depicting an exemplary embodiment of a position location system 100 in which the present invention may be utilized. The system 100 comprises a mobile receiver 102 in communication with a server 108 via a wireless communication network 110 (e.g., a cellular communication network). For example, the server 108 may be disposed in a serving mobile location center (SMLC) of the wireless communication network 110. The mobile receiver 102 obtains satellite measurement data (e.g., pseudoranges, Doppler measurements) with respect to a plurality of satellites 112. The server 108 obtains satellite navigation data (e.g., orbit trajectory information, such as ephemeris) for at least the satellites 112 in view. Position information for the mobile receiver 102 is computed using the satellite measurement data and the satellite navigation data.

Satellite navigation data, such as ephemeris for at least the satellites 112, may be collected by a network of tracking stations ("reference network 114"). The reference network 114 may include several tracking stations that collect satellite navigation data from all the satellites in the constellation, or a few tracking stations, or a single tracking station that only collects satellite navigation data for a particular region of the world. An exemplary system for collecting and distributing ephemeris is described in commonly-assigned U.S. Pat. No. 6,411,892, issued Jun. 25, 2002, which is incorporated by reference herein in its entirety. The reference network 114 may provide the collected satellite navigation data to the server 108.

The mobile receiver. 102 is configured to receive assistance data from the server 108. In one embodiment, the assistance data comprises acquisition assistance data. The acquisition assistance data may comprise expected pseudoranges or pseudorange models, expected Doppler data, and like type acquisition aiding information known in the art. Exemplary pseudorange models and details of their formation are described in commonly-assigned U.S. Pat. No. 6,453,237, issued Sep. 17, 2002, which is incorporated by reference herein in its entirety. For example, the mobile receiver 102 may request and receive acquisition assistance data from the server 108 and send satellite measurement data to the server 108 along with a time-tag. The server 108 then locates position of the mobile receiver 102 (referred to as the mobile station assisted or "MS-assisted" configuration). Acquisition assistance data may be computed by the server 108 using satellite trajectory data (e.g., ephemeris or other satellite trajectory model) and an approximate position of the mobile receiver 102. An approximate position of the mobile receiver 102 may be obtained using various position estimation techniques known in the art, including use of transitions between base stations of the wireless communication network 110, use of a last known location of the mobile receiver 102, use of a location of a base station of the wireless communication network 110 in communication with the mobile receiver 102, use of a location of the wireless communication network 110 as identified by a network 10, or use of a location of a cell site of the wireless communication network 110 in which the mobile receiver 102 is operating as identified by a cell ID.

In another embodiment, the assistance data comprises satellite trajectory data (e.g., ephemeris, Almanac, or some other orbit model). Upon request, the server 108 may transmit satellite trajectory data to the mobile receiver 102 via the wireless communication network 110. Alternatively, the mobile receiver 102 may receive satellite trajectory data via a communications network 142 (e.g., a computer network, such as the Internet). Notably, the satellite trajectory data may comprise a long term satellite trajectory model, as described in commonly-assigned U.S. Pat. No. 6,560,534, issued May 6, 2003, which is incorporated by reference herein in its entirety, Having received the satellite trajectory data, the mobile receiver 102 may locate its own position using the satellite measurement data (referred to as the "MS-Based" configuration). In yet another embodiment, the mobile receiver 102 may locate its own position by obtaining ephemeris directly from the satellites 112, rather, than from the server 108. That is, the mobile receiver 102 locates its own position without assistance from the server 108 (referred to as the "autonomous" configuration).

The server 108 illustratively comprises an input/output (I/O) interface 128, a central processing unit (CPU) 126, support circuits 130, and a memory 134. The CPU 126 is coupled to the memory 134 and the support circuits 130. The memory 134 may be random access memory, read only memory, removable storage, hard disc storage, or any combination of such memory devices. The support circuits 130 include conventional cache, power supplies, clock circuits, data registers, I/O interfaces, and the like to facilitate operation of the server 108. The I/O interface 128 is configured to receive satellite navigation data from the reference network 114 and is configured for communication with the wireless communication network 110, In addition, the I/O interface 128 may be in communication with the network 142.

In one embodiment, the position location system 100 includes a travel information server 144. The travel information server 144 is configured to provide map information and the like for providing travel instructions from an origin to a destination (a "route"). The mobile receiver 102 may request and receive routing information from the travel information server 144 through the network 142 or through the wireless communication network 110 via the server 108. Such travel information servers are well known in the art.

The mobile receiver 102 illustratively comprises a GPS receiver 104, a wireless transceiver 106, a processor 122, an I/O interface 150, and a memory 120. In one embodiment, the mobile receiver 102 includes a sequential estimation filter, such as a Kalman filter 138. In one embodiment, the mobile receiver 102 also includes a motion measurement device 152. The GPS receiver 104 receives satellite signals from the satellites 112 using an antenna 116. The GPS receiver 104 may comprise a conventional GPS receiver. The wireless transceiver 106 receives a wireless signal from the wireless communication network 110 via an antenna 118. The GPS receiver 104 and the wireless transceiver 106 are controlled by the processor 122. The I/O interface 150 may comprise a modem or like-type communication interface for communicating with the network 142.

The processor 122 may comprise a microprocessor, instruction-set processor (e.g., a microcontroller), or like type processing element known in the art. The processor 122 is coupled to the memory 120. The memory 120 may be random access memory, read only memory, removable storage, hard disc storage, or a y combination of such memory devices. Various processes and methods described herein may be implemented using software 140 store in the memory 120 for execution by the processor 122. Notably, the Kalman filter 138 may be implemented via the software 140. Alternatively, the mobile receiver 102 may implement such processes and methods in hardware or a combination of software and hardware, including any number of processors independently executing various programs and dedicated hardware, such as application specific integrated circuits (ASICs), field programmable gate arrays (FPGAs), and the like. Notably, the Kalman filter 138 may be implemented using hardware or a combination of hardware and software.

Position of the mobile receiver 102 may be located using a navigation model in a well-known manner. Notably, in the general satellite navigation problem, there are nine unknowns:

Three position unknowns: x, y, z
Three velocity unknowns: $\dot{x}, \dot{y}, \dot{z}$
Three clock unknowns: $t_c, t_s, f_c$ where $t_c$ is the common mode timing error (usually a sub-millisecond value in GPS), $t_s$ is the absolute time tag error, and $f_c$ is the frequency error in a local oscillator within the mobile receiver 102. One or more of the variables may be known or estimated based on a-priori information (e.g., $t_s$ may known if the mobile receiver 102 is calibrated to precise GPS time). One or more of the unknown variables may be solved for using satellite measurement data from the mobile receiver 102 in a well-known manner.

In another embodiment, a history of information may be used to continuously produce a filtered position result. The incorporation of history relies upon a formal model or an informal set of assumptions regarding the tendency of the mobile receiver 102 to move from position to position. By placing bounds on the motion of the mobile receiver 102 (and the behavior of a clock in the mobile receiver 102), filtering time constants may be selected that adequately track receiver dynamics, yet allow improved accuracy through the averaging process. Another advantage of filtering techniques is that the mobile receiver 102 may continue to operate when insufficient satellite measurements exist to create independent solutions. For purposes of clarity by example, an aspect of the invention is described with respect to a Kalman filter. It is to be understood, however, that other types of sequential estimation filters may be employed that are known in the art, such as Batch Filters.

Notably, position of the mobile receiver 102 may be located using the Kalman filter 138. The Kalman filter 138 includes a plurality of states, such as position states, velocity states, clock states, and frequency states. The satellite measurements are applied to the Kalman filter 138, which is configured to provide position upon request. Multiple measurement sets may be used to update the states of the Kalman filter 138. The update weighs both the current state information and the measurements to produce new state information. For further details regarding operation of the Kalman filter 138, the reader is referred to commonly-assigned U.S. patent application Ser. No. 10/790,614, filed Mar. 1, 2004, which is incorporated by reference herein in its entirety.

In operation, the mobile receiver 102 periodically executes a measurement cycle, where pseudoranges from the mobile receiver 102 to the satellites 112 are measured by the GPS receiver 104. In one embodiment, the measurement cycle further includes application of the pseudoranges to the Kalman filter 138. The measurements are used to periodically locate position of the mobile receiver 102. Position may be located using the Kalman filter 138 or using a navigation model. For example, the mobile receiver 102 may be traveling along a route as set forth by the travel information server 144. Progress of the mobile receiver 102 along a route may be tracked by periodically locating its position. Notably, the frequency of the measurement cycle and the frequency of the position location cycle (position fix cycle) may be the same or may be different (e.g., measurements may be obtained more of less often than position computations). In another example, the mobile receiver 102 may be tracked (i.e., location of the mobile receiver 102 may be periodically located) without having a route designated by the travel information server 144.

As discussed below, the frequency of the measurement cycle may be automatically adjusted in response to a course-change event, such as a route-critical event, a motion-change event (heading and/or speed), or combination of such events. Note that the term "course" is used in a general sense to include heading and/or speed. The GPS receiver 104 may receive a notification of such an event from the processor 122. Notably, a route-critical event may be triggered when the mobile receiver 102 is within a threshold distance of a route-critical location along a route (e.g., a route designated by the travel information server 144). A route-critical location may be any location or group of locations relevant to travel along a route such as, for example, an approaching intersection, an approaching fork in the road, an approaching maneuver (e.g., a required turn to stay on the established route), an approaching off-ramp, an approaching freeway exit, and like-type travel events.

A motion-change event may be triggered in response to a change in motion of the mobile receiver 102 with respect to a threshold value. In one embodiment, a motion change event is detected by the Kalman filter 138. The Kalman filter 138 may be configured with states that continuously estimate velocity and heading of the mobile receiver 102. A change in such states beyond a threshold may be used to indicate a change in velocity and/or heading of the mobile receiver 102. If the Kalman filter 138 detects changes in one or more of such velocity and heading states, the Kalman filter 138 may trigger a motion-change event. In another embodiment, a change in motion of the mobile receiver 102 may be detected using one or more motion measurement devices 152. The motion measurement devices 152 may comprise an accelerometer, a speedometer, compass, flux-gate compass, and like-type motion measurement, motion detection, and direction measurement devices known in the art, as well as combinations of such devices. For a given type of motion measurement, a threshold may be established in accordance with a given metric to delineate whether the mobile receiver 102 has transitioned from one motion state to another. In yet another embodiment, a combination of the Kalman filter 138 and motion measurement devices 152 may be used to trigger the motion-change event.

The frequency of the measurement cycle may be increased or decreased in response to a triggered event. For example, the frequency of the measurement cycle may be increased in response to a route-critical event. By increasing the frequency of the measurement cycle, the mobile receiver 102 obtains measurements more often to achieve greater tracking accuracy. This may assist the user of the mobile, receiver 102 to navigate through the route-critical location. In another example, the frequency of the measurement cycle may be decreased in response to a motion-change vent indicative of a stationary condition. If the mobile receiver 102 is in a stationary condition, the mobile receiver 102 may conserve power by performing less measurements.

Figure 2:
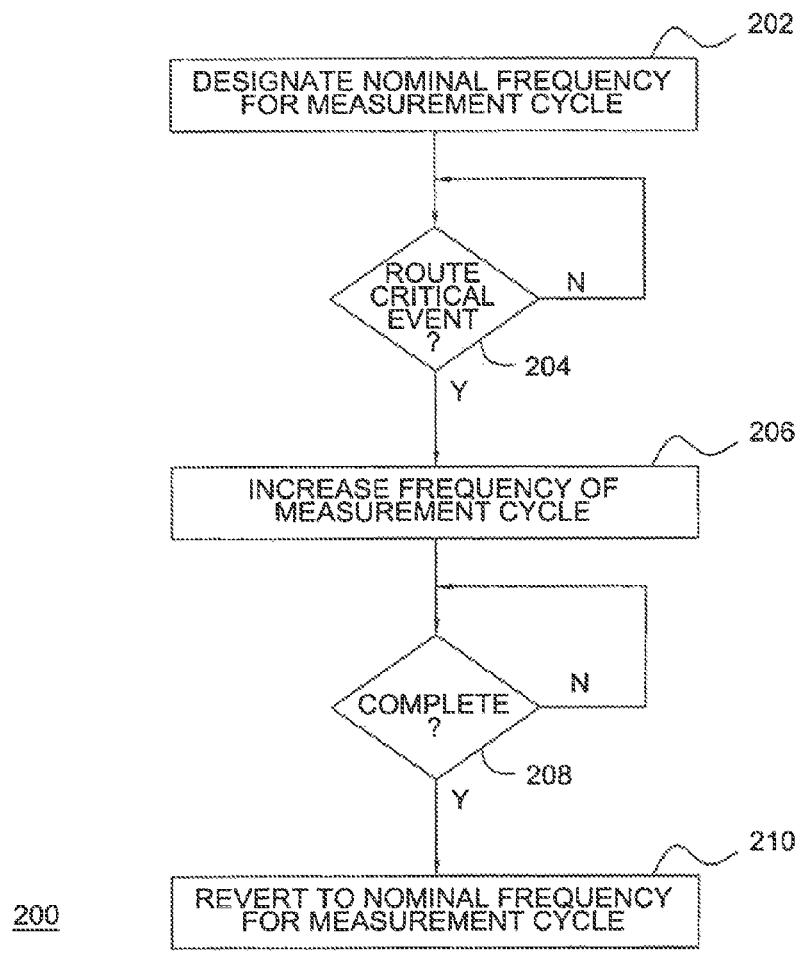
FIG. 2 is a flow diagram depicting an exemplary embodiment of a method for adjusting a measurement cycle in a satellite signal receiver in accordance with the invention.

FIG. 2 is a flow diagram depicting an exemplary embodiment of a method 200 for adjusting a measurement cycle in a satellite signal receiver in accordance with the invention. The method begins at step 202, where a nominal frequency is designated for the measurement cycle of the satellite signal receiver. That is, the satellite signal receiver executes the measurement cycle at a predefined, nominal frequency. The nominal frequency for execution of the measurement cycle is a design parameter based on desired tracking accuracy versus power consumption. The nominal frequency may be set such that sufficient measurements exist for a desired frequency of position computations. For a given position fix frequency, less measurements are required if the Kalman filter 138 is employed, since the Kalman filter 138 is capable of producing a continuously filtered position result based on previous measurements. For example, the measurement cycle may be performed once every five seconds nominally.

At step 204, a determination is made as to whether a route-critical event has occurred. If not, the frequency of the measurement cycle is maintained at the nominal frequency and step 204 is repeated. If a route-critical event has occurred, the method 200 proceeds to step 206. At step 206, the frequency of the measurement cycle is increased. In one embodiment, the frequency of the measurement cycle may be increased from the nominal frequency to an increased frequency value. In another embodiment, an increased frequency value may be selected from a plurality of increased frequency values, and the frequency of the measurement cycle may be increased to the selected value. Selection of an increased frequency value may be based on the type of route-critical event (e.g., an approaching intersection may engender less of an increase in frequency than an approaching sequence of required turns).

At step 208, a determination is made as to whether the route-critical event is complete. If not, the frequency of the measurement cycle is maintained at the increased frequency and step 208 is repeated. If the route-critical event has completed, the method 200 proceeds to step 210. At step 210, the frequency of the measurement cycle reverts back to the nominal frequency value. The route-critical event may be deemed complete, for example, if the mobile receiver 102 is outside a route-critical location by a threshold distance. Alternatively, a route-critical event may be deemed complete after a predetermined time period has elapsed. The method 200 may be repeated for various route-critical events.

For purposes of clarity by example, the method 200 has been described with respect to adjustment of the measurement cycle from a nominal value. It is to be understood, however, that the frequency may be adjusted from a current value (whether the nominal value. or not) to any other increased value.

Figure 3:
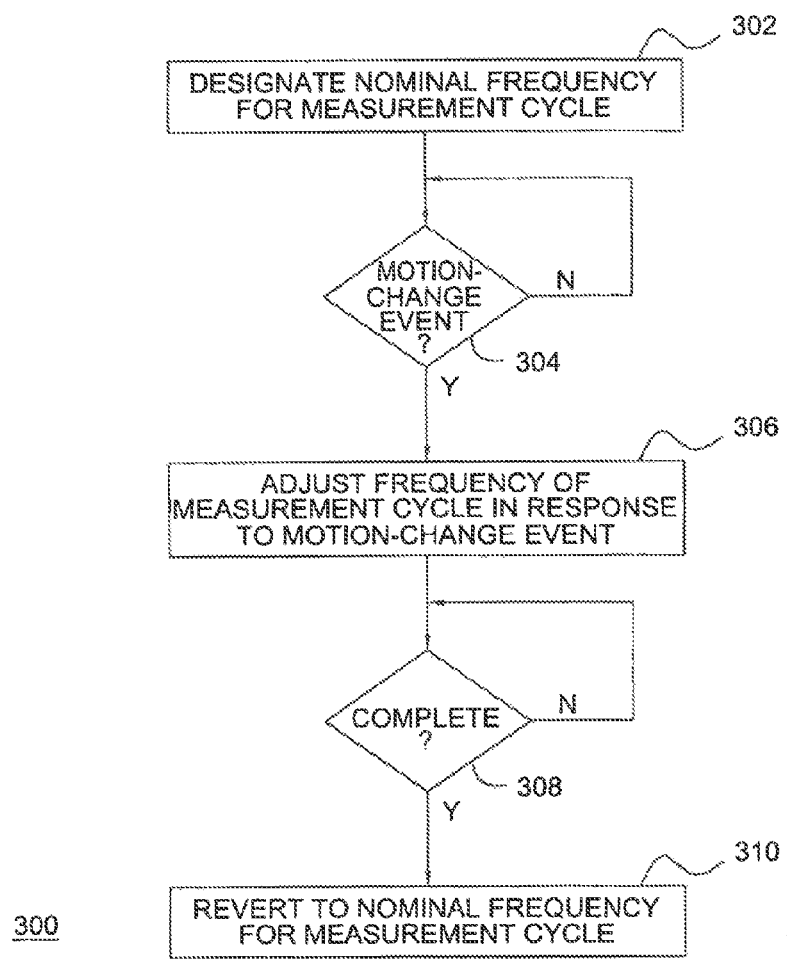
FIG. 3 is a flow diagram depicting another exemplary embodiment of a method for adjusting a measurement cycle in a satellite signal receiver in accordance with the invention.

FIG. 3 is a flow diagram depicting another exemplary embodiment of a method 300 for adjusting a measurement cycle in a satellite signal receiver in accordance with the invention. The method 300 begins at step 302, where a nominal frequency is designated for the measurement cycle of the satellite signal receiver. At step 304, a determination is made as to whether a motion change event has occurred. If not, the frequency of the measurement cycle is maintained at the nominal frequency and step 304 is repeated. If a motion-change event has occurred, the method 300 proceeds to step 306.

At step 306, the frequency of the measurement cycle is adjusted in response to the motion-change event. The adjustment of the measurement cycle may be based on the type of motion-change event. For example, if the motion-change event indicates that the mobile receiver 102 has transitioned into a stationary state, the frequency of the measurement cycle may be decreased from a nominal value. In another example, if the motion-change event Indicates that the mobile receiver 102 has changed direction, the frequency of the measurement cycle may be increased from a nominal value. By increasing the frequency of the measurement cycle, the mobile receiver 102 obtains measurements more often to achieve greater tracking accuracy. This may assist the user of the mobile receiver 102 to navigate through a critical location as indicated by the change in direction. Those skilled in the art will appreciate that various other types of motion changes, may be used to trigger increases or decreases in the frequency of the measurement cycle at step 306.

At step 308, a determination is made as to whether the motion-change event is complete. If not, the frequency of the measurement cycle is maintained at the increased frequency and step 308 is repeated. If the motion-change event has completed, the method 300 proceeds to step 310. At step 310, the frequency of the measurement cycle reverts back to the nominal frequency value. The motion-change event may be deemed complete, for example, if the mobile receiver 102 after a predetermined time has elapsed or after a predetermined time has elapsed without the occurrence of another motion-change event. The method 300 may be repeated for various motion-change events.

For purposes of clarity by example, the method 300 has been described with respect to adjustment of the measurement cycle from a nominal value. It is to be understood, however, that the frequency may be adjusted from a current value (whether the nominal value or not) to any other increased value. Furthermore, those skilled in the art will appreciate that a combination of the method 200 of FIG. 2 and the method 300 of FIG. 3 may be performed to adjust the frequency of the measurement cycle in response to either a route-critical event or a motion-change event.

Method and apparatus for adjusting the measurement cycle of a satellite signal receiver has been described. In one embodiment, the measurement cycle of the satellite signal receiver is adjusted in response to an external event (referred to as a course-change event), such as a route-critical event, a motion-change event, or a combination of such events. The frequency of the measurement cycle may be increased or decreased depending on the type of event that triggered the adjustment. The invention may be used to automatically adjust the measurement cycle frequency according to the user's current need. For example, a user's need of greater tracking accuracy through a route-critical location is met by automatically increasing the frequency of the measurement cycle, which provides more measurements. A user's need of less tracking accuracy while in a stationary state is net by automatically decreasing the frequency of the measurement cycle, which conserves more power.

In the preceding discussion, the invention has been described with reference to application upon the United States Global Positioning System (GPS). It should be evident, however, that these methods are equally applicable to similar satellite systems, and in particular, the Russian GLONASS system, the European GALILEO system, combinations of these systems with one another, and combinations of these systems and other satellites providing similar signals, such as the wide area augmentation system WAAS) and SBAS that provide GPS-like signals. The term "GPS" used herein includes such alternative satellite positioning systems, including the Russian GLONASS system, the European GALILEO system, the WAAS system, and the SBAS system, as well as combinations thereof.

While the foregoing is directed to embodiments of the present invention, other and further embodiments of the invention may be devised without departing from the basic scope thereof and the scope thereof is determined by the claims that follow.

What is claimed is:

1. A method of measuring a wireless signal in a wireless receiver, comprising:
designating a measurement cycle frequency for the wireless receiver at a nominal frequency;

determining that a motion change event has occurred to the wireless receiver based on detecting a transition between base stations of a wireless communications network; and adjusting the measurement cycle frequency in response to the motion change event.

2. The method of claim 1, further comprising determining that the motion change event is complete.

3. The method of claim 2, further comprising resetting the measurement cycle frequency to the nominal frequency in response to determining that the motion change event is complete.

4. The method of claim 2, wherein the motion change event is determined to be complete after a predetermined amount of time has elapsed.

5. The method of claim 2, wherein the motion change event is determined to be complete after a predetermined time has elapsed without the occurrence of another motion change event.

6. The method of claim 1, wherein the motion change event comprises a change in velocity or a change in direction.

7. The method of claim 1, further comprising adjusting the measurement cycle frequency from a current frequency to a new frequency in response to detecting the occurrence of a route critical event.

8. The method of claim 7, wherein the current frequency is different from the nominal frequency.

9. The method of claim 7, further comprising adjusting the measurement cycle frequency from the new frequency back to the current frequency in response to determining that the route critical event is complete.

10. The method of claim 9, wherein the route critical event is complete after a predetermined time period has elapsed or when the wireless receiver is outside of a route critical location by a threshold distance.

11. A wireless receiver device, comprising:
a receiver;
a wireless transceiver;
a memory; and
a processor configured to:
designate a measurement cycle frequency for the wireless receiver at a nominal frequency;
determine that a motion change event has occurred to the wireless receiver based on detecting a transition between base stations of a wireless communications network; and
adjust the measurement cycle frequency in response to the motion change event.

12. The wireless receiver device of claim 11, wherein the processor is further configured to determine that the motion change event is complete.

13. The wireless receiver device of claim 12, wherein the processor is further configured to reset the measurement cycle frequency to the nominal frequency in response to determining that the motion change event is complete.

14. The wireless receiver device of claim 12, wherein the processor is configured to determine that the motion change event is complete after a predetermined amount of time has elapsed.

15. The wireless receiver device of claim 12, wherein the processor is configured to determine that the motion change event is complete after a predetermined time has elapsed without the occurrence of another motion change event.

16. The wireless receiver device of claim 11, wherein the motion change event comprises a change in velocity or a change in direction.

17. The wireless receiver device of claim 11, wherein the processor is further configured to adjust the measurement cycle frequency from a current frequency to a new frequency in response to detecting the occurrence of a route critical event.

18. The wireless receiver device of claim 17, wherein the current frequency is different from the nominal frequency.

19. The wireless receiver device of claim 17, wherein the processor is further configured to adjust the measurement cycle frequency from the new frequency back to the current frequency in response to determining that the route critical event is complete.

20. The wireless receiver device of claim 19, wherein the processor is configured to determine that the route critical event is complete after a predetermined time period has elapsed or when the wireless receiver is outside of a route critical location by a threshold distance.

* * * * *